(12) United States Patent
Yang et al.

(10) Patent No.: US 11,729,731 B2
(45) Date of Patent: Aug. 15, 2023

(54) INFORMATION TRANSMISSION METHOD, NETWORK DEVICE AND TERMINAL

(71) Applicant: DATANG MOBILE COMMUNICATIONS EQUIPMENT CO., LTD., Beijing (CN)

(72) Inventors: Meiying Yang, Beijing (CN); Deshan Miao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 44 days.

(21) Appl. No.: 17/272,207

(22) PCT Filed: Aug. 16, 2019

(86) PCT No.: PCT/CN2019/100955
§ 371 (c)(1),
(2) Date: Feb. 26, 2021

(87) PCT Pub. No.: WO2020/042920
PCT Pub. Date: Mar. 5, 2020

(65) Prior Publication Data
US 2021/0321346 A1    Oct. 14, 2021

Related U.S. Application Data

(60) Provisional application No. PCT/CN2019/100955, filed on Aug. 16, 2019.

(30) Foreign Application Priority Data

Aug. 31, 2018 (CN) .......................... 201811014752.8

(51) Int. Cl.
*H04W 56/00* (2009.01)
*H04W 52/02* (2009.01)
*H04W 68/00* (2009.01)

(52) U.S. Cl.
CPC ..... *H04W 56/001* (2013.01); *H04W 52/0209* (2013.01); *H04W 68/00* (2013.01)

(58) Field of Classification Search
CPC ........... H04W 56/001; H04W 52/0209; H04W 68/00; H04W 52/0216; H04W 68/005;
(Continued)

(56) References Cited

U.S. PATENT DOCUMENTS

2015/0358975 A1    12/2015 Yang et al.
2018/0026698 A1    1/2018 Lee et al.
(Continued)

FOREIGN PATENT DOCUMENTS

CN    108012329 A    5/2018
CN    108282859 A    7/2018
(Continued)

OTHER PUBLICATIONS

Notification of Reason for Refusal from KR app. No. 10-2021-7009630, dated Jan. 18, 2021, with English translation from Global Dossier, all pages.
(Continued)

*Primary Examiner* — Eric Myers
(74) *Attorney, Agent, or Firm* — Ladas & Parry, LLP

(57) ABSTRACT

An information transmission method, a network device and a terminal are provided. The information transmission method includes: transmitting a target synchronization signal/physical broadcast channel (SS/PBCH) block within a target time window; where the target SS/PBCH block refers to at least one synchronization signal/physical broadcast channel block needed by the terminal for network synchronization and/or time-frequency tracking, a time length corresponding to the target time window is smaller than a time length corresponding to a target transmission cycle, the target transmission cycle is a transmission cycle of an
(Continued)

SS/PBCH block, and the target time window is before a paging occasion or an ending moment of the target time window is the same as a moment of a paging occasion.

20 Claims, 3 Drawing Sheets

(58) Field of Classification Search
CPC .. H04W 76/28; H04W 52/322; H04L 5/0048; H04L 5/0078; Y02D 30/70
See application file for complete search history.

(56) References Cited

U.S. PATENT DOCUMENTS

| | | | |
|---|---|---|---|
| 2019/0268205 | A1 | 8/2019 | Shin et al. |
| 2019/0327123 | A1 | 10/2019 | Wang et al. |
| 2019/0327709 | A1 | 10/2019 | Li et al. |
| 2020/0221508 | A1 | 7/2020 | Huang et al. |
| 2021/0007076 | A1* | 1/2021 | Ljung ................. H04W 68/02 |

FOREIGN PATENT DOCUMENTS

| | | |
|---|---|---|
| CN | 108282862 A | 7/2018 |
| EP | 3297334 A1 | 3/2018 |
| WO | 2017213420 A1 | 12/2017 |
| WO | 2018129319 A1 | 7/2018 |

OTHER PUBLICATIONS

Nokia, Nokia Shanghai Bell, "Determination of PF and PO in NR", R2-1803174, 3GPP TSG-RAN WG2 Meeting #101, Athens, Greece, Feb. 26-Mar. 2, 2018, all pages.
Extended European Search Report from EP app. No. 19854847.1, dated Oct. 11, 2021, all pages.
Spreadtrum Communications, "Discussion on SS/PBCH block in NR-U operation", R1-1806410, 3GPP TSG RAN WG1 Meeting #93, Busan, Korea, May 21-25, 2018, all pages.
"On configurations and procedures of power saving signal", R1-1716985, 3GPP TSG RAN WG1 Meeting #90bis, Prague, Czech Republic, Oct. 9-13, 2017.
"Further discussion on paging design", R1-1718332, 3GPP TSG RAN WG1 Meeting 90bis, Prague, CZ, Oct. 9-13, 2017.
"Discussion on paging design", R1-1719560, 3GPP TSG RAN WG1 Meeting 91, Reno, USA, Nov. 27-Dec. 1, 2017.
"Offline summary for AI 7.1.3 on Paging", R1-1721356, , 3GPP TSG RAN WG1 Meeting 91, Reno, USA, Nov. 27-Dec. 1, 2017.
"Paging Occasions in NR", Tdoc R2-1802338, revision of R2-1800360, 3GPP TSG-RAN WG2 #101, Athens, Greece, Feb. 26-Mar. 2, 2018.
First Office Action and Search Report from CN app. No. 201811014752. 8, dated Jul. 3, 2020, with English translation from Global Dossier.
First Office Action and Search Report from TW app. No. 108131009, dated Jul. 3, 2021, with machine English translation.
International Search Report from PCT/CN2019/100955, dated Oct. 28, 2019, with English translation from WIPO.
Written Opinion of the International Searching Authority from PCT/CN2019/100955, dated Oct. 28, 2019, with English translation from WIPO.
International Preliminary Report on Patentability from PCT/CN2019/100955, dated Mar. 2, 2021, with English translation from WIPO.

* cited by examiner

INFORMATION TRANSMISSION METHOD, NETWORK DEVICE AND TERMINAL

CROSS-REFERENCE TO RELATED APPLICATIONS

This application is the U.S. national phase of PCT Application No. PCT/CN2019/100955 filed on Aug. 16, 2019, which claims a priority to Chinese Patent Application No. 201811014752.8 filed on Aug. 31, 2018 in China, the disclosures of which are incorporated in their entireties by reference herein.

TECHNICAL FIELD

The present disclosure relates to the technical field of communication application, and in particular to an information transmission method, a network device and a terminal.

BACKGROUND

With the development of wireless communication systems, terminal types and service types are diversified, and requirements on terminal power saving, network resource saving and meeting various service types coexist. Discontinuous reception (Discontinuous receive, DRX) is an important technical solution for power saving of a user equipment (User Equipment, UE) (or referred to as a terminal). In this scheme, when the UE has no demand for data sending and receiving, it enters a DRX-OFF state, and some devices of the UE, such as radio frequency or baseband, is in an off or low power consumption state, so that the purpose of saving power is achieved. Once there is data transceiving, the UE needs to wake up for data transceiving. Furthermore, in a DRX-Idle state, the UE periodically detects paging on a paging occasion (Paging Occasion, PO), and after detection is completed, the UE may enter a sleep mode to achieve the purpose of saving power.

In order to perform paging detection, the UE needs to perform network synchronization and time-frequency tracking before paging detection. In new radio (Next radio, NR), the synchronization signal/physical broadcast channel (SS/PBCH) block is transmitted periodically, and the transmission cycle may be configured to be 5 ms, 10 ms, 20 ms, 40 ms, 80 ms or 160 ms. Therefore, for the UE to detect paging, the UE needs to complete synchronization and time-frequency tracking in advance. For example, if the UE is in an environment with strong interference, or the UE is at an edge of cell coverage, or the UE is in a non-synchronized state with the network, then 2-3 SS/PBCH burst sets (synchronization signal/physical broadcast channel block burst sets) may be needed to complete synchronization and channel tracking, that is, the UE may wake up at least one SS/PBCH cycle in advance so as to avoid a phenomenon that the UE cannot receive the SS/PBCH signal before the PO moment and cannot perform paging detection. In this case, if the SS/PBCH cycle is configured to be relatively large, e.g. more than 20 ms, or the quantity of SS/PBCHs in the SS/PBCH burst set is relatively smaller, e.g. only 1 SS/PBCH being configured in 1 slot, then the UE needs to wake up in advance for a longer time, thereby resulting in increased power consumption of the UE.

SUMMARY

The present disclosure is to provide an information transmission method, a network device and a terminal, for solving the problem that the UE at least needs to wake up in advance for one SS/PBCH cycle due to synchronizing and then increased power consumption is caused.

In order to achieve the above object, the present disclosure provides an information transmission method, applied to network device, which includes:

transmitting, within a target time window, a target synchronization signal/physical broadcast channel (SS/PBCH) block;

where the target synchronization signal/physical broadcast channel (SS/PBCH) block refers to at least one synchronization signal/physical broadcast channel block required by a terminal for network synchronization and/or time-frequency tracking, a time length corresponding to the target time window is smaller than a time length corresponding to a target transmission cycle, the target transmission cycle is a transmission cycle of a synchronization signal/physical broadcast channel (SS/PBCH) block, and the target time window is before a paging occasion or an ending moment of the target time window is the same as a moment of a paging occasion.

Before the transmitting the target synchronization signal/physical broadcast channel (SS/PBCH) block, the method further includes:

acquiring power-saving configuration information of the terminal; and in a case that the power-saving configuration information indicates that the terminal supports power-saving configuration, transmitting the target synchronization signal/physical broadcast channel (SS/PBCH) block.

After the transmitting the target synchronization signal/physical broadcast channel (SS/PBCH) block, the method further includes:

sending a paging message on the paging occasion.

The transmitting, within the target time window, the target synchronization signal/physical broadcast channel (SS/PBCH) block includes:

starting to transmit the target synchronization signal/physical broadcast channel (SS/PBCH) block at a first moment in the target time window, where the first moment is a moment corresponding to a first time unit in the target time window, and the first moment is a starting moment of the target time window or a moment after the starting moment.

A second moment at which the transmission of the target synchronization signal/physical broadcast channel (SS/PBCH) block is completed is the ending moment of the target time window or a moment before the ending moment;

a second time unit where the ending moment of the target time window is located is the same as a third time unit where the paging occasion is located; or, a second time unit where the ending moment of the target time window is located is before a third time unit where the paging occasion is located.

The time length corresponding to the target time window being smaller than the time length corresponding to the target transmission cycle includes:

the time length of the target time window is smaller than a time length corresponding to a minimum target transmission cycle configurable by the network device; or, the quantity of time units corresponding to the target time window is smaller than the total quantity of time units corresponding to the target transmission cycle.

The target synchronization signal/physical broadcast channel (SS/PBCH) block occupies N continuous or discontinuous time units within the target time window and N is a positive real number;

where N is configured by the network device according to a synchronization state of the terminal, a cell position where the terminal is located and/or an interference strength of a position where the terminal is located; or, N is pre-agreed by a protocol; or, N is determined by the terminal and notified to the network device.

The time unit includes: a counter, a slot, a subframe, an orthogonal frequency division multiplexing (OFDM) symbol, a cyclic prefix orthogonal frequency division multiplexing (CP-OFDM) symbol or a discrete Fourier transform spread orthogonal frequency division multiplexing (DFT-s-OFDM) symbol.

In order to achieve the above object, embodiments of the present disclosure also provide an information transmission method, applied to a terminal, which includes:

receiving, within a target time window, a target synchronization signal/physical broadcast channel (SS/PBCH) block;

where the target synchronization signal/physical broadcast channel (SS/PBCH) block refers to at least one synchronization signal/physical broadcast channel block required by the terminal for network synchronization and/or time-frequency tracking, a time length corresponding to the target time window is smaller than a time length corresponding to a target transmission cycle, the target transmission cycle is a transmission cycle of a synchronization signal/physical broadcast channel (SS/PBCH) block, and the target time window is before a paging occasion or an ending moment of the target time window is the same as a moment of a paging occasion.

Before the receiving the target synchronization signal/physical broadcast channel (SS/PBCH) block, the method further includes:

acquiring power-saving configuration information of the terminal; and receiving the target synchronization signal/physical broadcast channel (SS/PBCH) block in a case that the power-saving configuration information indicates that the terminal supports power-saving configuration.

After the receiving the target synchronization signal/physical broadcast channel (SS/PBCH) block, the method further includes:

receiving a paging message on the paging occasion.

The receiving, within the target time window, the target synchronization signal/physical broadcast channel (SS/PBCH) block includes:

starting to receive the target synchronization signal/physical broadcast channel (SS/PBCH) block at a first moment in the target time window, where the first moment is a moment corresponding to a first time unit in the target time window, and the first moment is a starting moment of the target time window or a moment after the starting moment.

A second moment at which the transmission of the target synchronization signal/physical broadcast channel (SS/PBCH) block is completed is the ending moment of the target time window or a moment before the ending moment;

a second time unit where the ending moment of the target time window is located is the same as a third time unit where the paging occasion is located; or, a second time unit where the ending moment of the target time window is located is before a third time unit where the paging occasion is located.

The time length corresponding to the target time window being smaller than the time length corresponding to the target transmission cycle includes:

the time length of the target time window is smaller than a time length corresponding to a minimum target transmission cycle configurable by a network device; or, the quantity of time units corresponding to the target time window is smaller than the total quantity of time units corresponding to the target transmission cycle.

The target synchronization signal/physical broadcast channel (SS/PBCH) block occupies N continuous or discontinuous time units within the target time window and N is a positive real number;

N is configured by a network device according to a synchronization state of the terminal, a cell position where the terminal is located and/or an interference strength of a position where the terminal is located; or, N is pre-agreed by a protocol; or N is determined by the terminal and notified to a network device.

The time unit includes: a counter, a slot, a subframe, an orthogonal frequency division multiplexing (OFDM) symbol, a cyclic prefix orthogonal frequency division multiplexing (CP-OFDM) symbol or a discrete Fourier transform spread orthogonal frequency division multiplexing (DFT-s-OFDM) symbol.

In order to achieve the above object, embodiments of the present disclosure also provide a network device, which includes: a transceiver, a memory, a processor, and a program stored on the memory and executable on the processor, and the processor implements the following step when executing the program:

transmitting, within a target time window, a target synchronization signal/physical broadcast channel (SS/PBCH) block;

where the target synchronization signal/physical broadcast channel (SS/PBCH) block refers to at least one synchronization signal/physical broadcast channel block required by a terminal for network synchronization and/or time-frequency tracking, a time length corresponding to the target time window is smaller than a time length corresponding to a target transmission cycle, the target transmission cycle is the transmission cycle of a synchronization signal/physical broadcast channel (SS/PBCH) block, and the target time window is before a paging occasion or an ending moment of the target time window is the same as a moment of a paging occasion.

The processor also implements the following steps when executing the program:

acquiring power-saving configuration information of the terminal; and in a case that the power-saving configuration information indicates that the terminal supports power-saving configuration, transmitting the target synchronization signal/physical broadcast channel (SS/PBCH) block.

The processor also implements the following step when executing the program:

sending a paging message on the paging occasion.

The processor also implements the following step when executing the program:

starting to receive the target synchronization signal/physical broadcast channel (SS/PBCH) block at a first moment in the target time window, where the first moment is a moment corresponding to a first time unit in the target time window, and the first moment is a starting moment of the target time window or a moment after the starting moment.

A second moment at which the transmission of the target synchronization signal/physical broadcast channel (SS/PBCH) block is completed is the ending moment of the target time window or a moment before the ending moment;

a second time unit where the ending moment of the target time window is located is the same as a third time unit where the paging occasion is located; or, a second time unit where the ending moment of the target time window is located is before a third time unit where the paging occasion is located.

The time length corresponding to the target time window being smaller than the time length corresponding to the target transmission cycle includes:

the time length of the target time window is smaller than a time length corresponding to a minimum target transmission cycle configurable by a network device; or, the quantity of time units corresponding to the target time window is smaller than the total quantity of time units corresponding to the target transmission cycle.

The target synchronization signal/physical broadcast channel (SS/PBCH) block occupies N continuous or discontinuous time units within the target time window and N is a positive real number;

N is configured by a network device according to a synchronization state of the terminal, a cell position where the terminal is located and/or an interference strength of a position where the terminal is located; or, N is pre-agreed by a protocol; or N is determined by the terminal and notified to a network device.

The time unit includes: a counter, a slot, a subframe, an orthogonal frequency division multiplexing (OFDM) symbol, a cyclic prefix orthogonal frequency division multiplexing (CP-OFDM) symbol or a discrete Fourier transform spread orthogonal frequency division multiplexing (DFT-s-OFDM) symbol.

To achieve the above object, embodiments of the present disclosure also provide a computer-readable storage medium, having a computer program stored thereon, where the computer program, when executed by a processor, performs the steps of the information transmission method as described above.

To achieve the above object, embodiments of the present disclosure also provide a terminal, which includes: a transceiver, a memory, a processor, and a program stored on the memory and executable on the processor, where the processor performs the following step when executing the program:

receiving, within a target time window, a target synchronization signal/physical broadcast channel (SS/PBCH) block;

where the target synchronization signal/physical broadcast channel (SS/PBCH) block refers to at least one synchronization signal/physical broadcast channel block required by the terminal for network synchronization and/or time-frequency tracking, a time length corresponding to the target time window is less than a time length corresponding to a target transmission cycle, the target transmission cycle is a transmission cycle of a synchronization signal/physical broadcast channel (SS/PBCH) block, and the target time window is before a paging occasion or an ending moment of the target time window is the same as a moment of a paging occasion.

The processor also implements the following steps when executing the program:

acquiring power-saving configuration information of the terminal; and receiving the target synchronization signal/physical broadcast channel (SS/PBCH) block in a case that the power-saving configuration information indicates that the terminal supports power-saving configuration.

The processor also implements the following step when executing the program:

receiving a paging message on the paging occasion.

The processor also implements the following step when executing the program:

starting to receive the target synchronization signal/physical broadcast channel (SS/PBCH) block at a first moment in the target time window, where the first moment is a moment corresponding to a first time unit in the target time window, and the first moment is a starting moment of the target time window or a moment after the starting moment.

A second moment at which the transmission of the target synchronization signal/physical broadcast channel (SS/PBCH) block is completed is the ending moment of the target time window or a moment before the ending moment;

a second time unit where the ending moment of the target time window is located is the same as a third time unit where the paging occasion is located; or, a second time unit where the ending moment of the target time window is located is before a third time unit where the paging occasion is located.

The time length corresponding to the target time window being less than the time length corresponding to the target transmission cycle includes:

the time length of the target time window is smaller than a time length corresponding to a minimum target transmission cycle configurable by a network device; or, the quantity of time units corresponding to the target time window is smaller than the total quantity of time units corresponding to the target transmission cycle.

The target synchronization signal/physical broadcast channel (SS/PBCH) block occupies N continuous or discontinuous time units within the target time window and N is a positive real number;

where N is configured by a network device according to a synchronization state of the terminal, a cell position where the terminal is located and/or an interference strength of a position where the terminal is located; or, N is protocol pre-agreed by a protocol; or, N is determined by the terminal and notified to a network device.

The time unit includes: a counter, a slot, a subframe, an orthogonal frequency division multiplexing (OFDM) symbol, a cyclic prefix orthogonal frequency division multiplexing (CP-OFDM) symbol or a discrete Fourier transform spread orthogonal frequency division multiplexing (DFT-s-OFDM) symbol.

To achieve the above object, embodiments of the present disclosure also provide a computer-readable storage medium, having a computer program stored thereon, where the computer program, when executed by a processor, performs the steps of the information transmission method as described above.

In order to achieve the above object, embodiments of the present disclosure also provides a network device including:

a first transmitting module, configured to transmit, within a target time window, a target synchronization signal/physical broadcast channel (SS/PBCH) block;

where the target synchronization signal/physical broadcast channel (SS/PBCH) block refers to at least one synchronization signal/physical broadcast channel block required by the terminal for network synchronization and/or time-frequency tracking, a time length corresponding to the target time window is smaller than a time length corresponding to a target transmission cycle, the target transmission cycle is a transmission cycle of a synchronization signal/physical broadcast channel (SS/PBCH) block, and the target time window is before a paging occasion or an ending moment of the target time window is the same as a moment of a paging occasion.

To achieve the above object, embodiments of the present disclosure also provide a terminal including:

a first receiving module, configured to receive, within a target time window, a target synchronization signal/physical broadcast channel (SS/PBCH) block;

where the target synchronization signal/physical broadcast channel (SS/PBCH) block refers to at least one synchronization signal/physical broadcast channel block required by the terminal for network synchronization and/or time-frequency tracking, a time length corresponding to the target time window is smaller than a time length corresponding to a target transmission cycle, the target transmission cycle is a transmission cycle of a synchronization signal/physical broadcast channel (SS/PBCH) block, and the target time window is before a paging occasion or an ending moment of the target time window is the same as a moment of the paging occasion.

Embodiments of the present disclosure have the following beneficial effects.

According to the technical solutions of the embodiments of the present disclosure, the network device transmits in the target time window the target synchronization signal/physical broadcast channel (SS/PBCH) block, i.e., at least one synchronization signal/physical broadcast channel block required by the terminal for achieving network synchronization and/or time-frequency tracking, and the terminal receives the target SS/PBCH in the target time window; since the time length corresponding to the target time window is smaller than the transmission cycle of the synchronization signal/physical broadcast channel (SS/PBCH) block, the terminal can complete synchronizing and/or time-frequency tracking in relatively short time before the paging occasion, thereby reducing the power consumption of the terminal.

DETAILED DESCRIPTION

To clarify the technical problems to be solved, technical solutions and advantages of the present disclosure, a detailed description will be given below with reference to specific embodiments and the accompanying drawings.

In order that those skilled in the art can better understand the embodiments of the present disclosure, the following description is presented.

Figure 1:
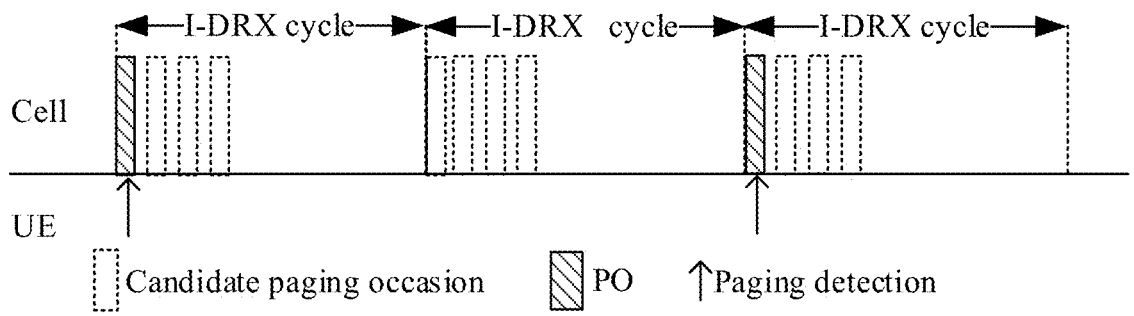
FIG. 1 is a schematic diagram of a DRX cycle in an RRC idle state.

As shown in FIG. 1, when in an idle state, the terminal enters a sleep state with extremely low power, and the terminal wakes up periodically, and detects a paging signal at the PO moment. When data transceiving is finished, the UE enters the sleep state with extremely low power again. I-DRX cycle represents a DRX cycle in a radio resource control (Radio Resource Control, RRC) idle state.

Figure 2:
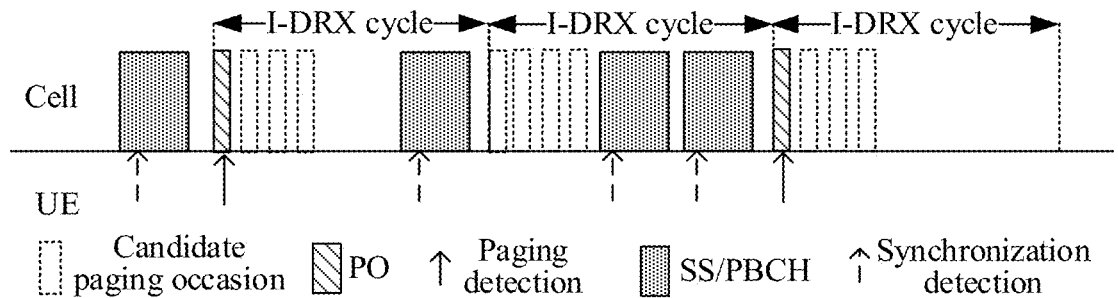
FIG. 2 is a schematic diagram of a relationship between DRX and SS/PBCH in an RRC idle state.

In the related technologies, in an RRC idle (Idle) or inactive (inactivity) state, the SS/PBCH is periodically transmitted, and it is considered that in a DRX-Idle/inactivity state, the UE completes synchronizing and time-frequency tracking before paging detection. As shown in FIG. 2, the time at which the UE needs to wake up in advance varies for different configurations and implementations.

Case One: The UE and the network are basically synchronized, the UE does not located at the cell edge, the UE is not subject to strong interference, and the SS/PBCH is configured in a slot. In implementation, ideally, the UE may cache data of one slot; after receiving the data of the slot, the UE performs detection of SS/PBCH to acquire synchronization information and time-frequency tracking information, then performs detection of paging, and performs detection of physical downlink shared channel (PDSCH) according to the detection result. In addition, the more general situation is that, the UE needs to wake up in advance to detect the SS/PBCH, completes synchronizing and time-frequency tracking, and then receives and detects paging on the paging occasion.

Case Two: The UE and the network are not synchronized, or the UE locates at the cell edge, or the UE is subject to strong interference: the UE needs multiple SS/PBCH burst sets to complete synchronizing and time-frequency tracking, e.g. the UE needs to wake up at least one SS/PBCH cycle in advance. Or, the UE needs to receive multiple SS/PBCH burst sets to complete synchronizing and time-frequency tracking.

Figure 3:
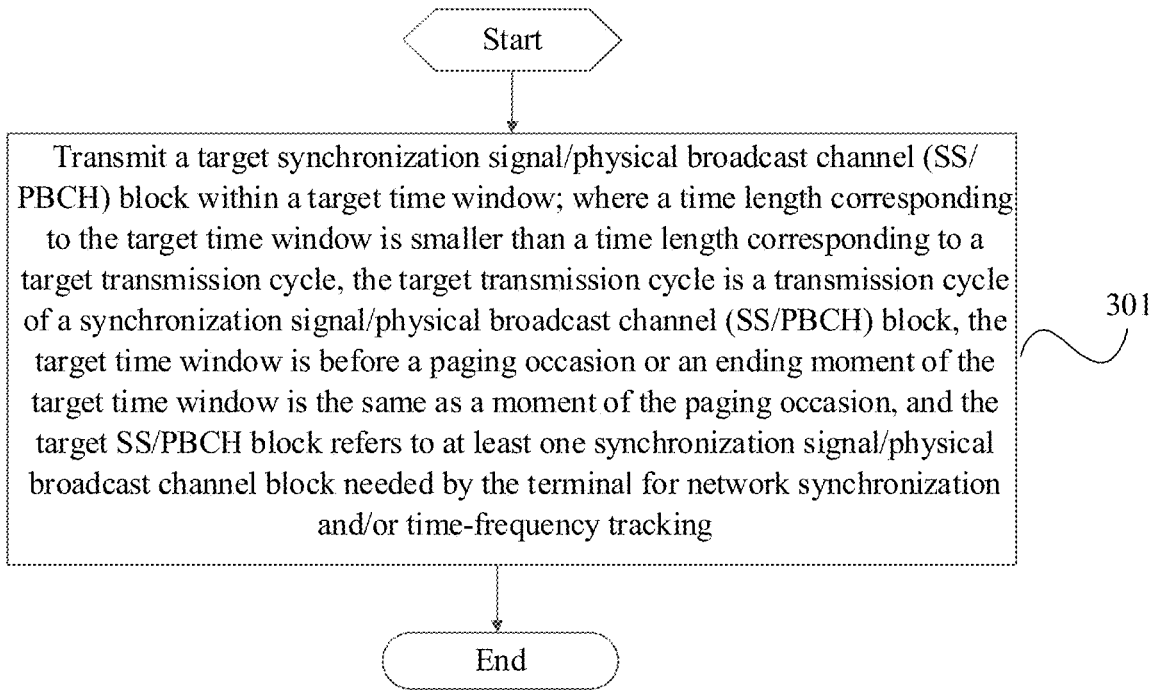
FIG. 3 is a first flow chart of an information transmission method provided by embodiments of the present disclosure.

According to the above description, the UE needs to wake up at least one SS/PBCH cycle in advance in order to realize synchronization, thereby resulting in increased power consumption. In view of the above, embodiments of the present disclosure provide an information transmission method which is applied to a network device. As shown in FIG. 3, the method includes the following steps.

Step 301 includes: transmitting, within a target time window, a target synchronization signal/physical broadcast channel (SS/PBCH) block.

A time length corresponding to the target time window is smaller than a time length corresponding to a target transmission cycle, the target transmission cycle is a transmission cycle of a synchronization signal/physical broadcast channel (SS/PBCH) block, the target time window is before a paging occasion or an ending moment of the target time window is the same as a moment of a paging occasion, and the target synchronization signal/physical broadcast channel (SS/PBCH) block refers to at least one synchronization signal/physical broadcast channel block required by a terminal for network synchronization and/or time-frequency tracking. For example, the target synchronization signal/physical broadcast channel (SS/PBCH) block may be one synchronization signal/physical broadcast channel (SS/PBCH) block when the terminal is in the center of the cell, and the target synchronization signal/physical broadcast channel (SS/PBCH) block may include multiple synchronization signal/physical broadcast channel (SS/PBCH) blocks when the terminal is in an environment with strong interference or the terminal is at the edge of cell coverage or the terminal is in a non-synchronous state with the network.

The time length of the target time window may be predefined by the network. For example, when the current transmission cycle of the SS/PBCH configured by the network device is 160 ms, the time length corresponding to the target time window may be defined as 10 ms. The time length of the target time window may be configured by the network or semi-statically configured, e.g. by radio resource control RRC signaling. The time length of the target time window may be dynamically configured through downlink control information (Downlink Control Information, DCI).

Specifically, the time length corresponding to the target time window being smaller than the time length corresponding to the target transmission cycle includes:

the time length of the target time window is smaller than a time length corresponding to a minimum target transmission cycle configurable by the network device.

For example, the target transmission cycle in NR-R 15 may be configured to be 5 ms, 10 ms, 20 ms, 40 ms, 80 ms or 160 ms, then the time length of the target time window may be configured to be less than 5 ms.

Or, the quantity of time units corresponding to the target time window is smaller than the total quantity of time units corresponding to the target transmission cycle.

The network device transmits the target SS/PBCH in the target time window, and the terminal receives the target SS/PBCH in the target time window. Since the time length corresponding to the target time window is less than the transmission cycle of the synchronization signal/physical broadcast channel (SS/PBCH) block, the terminal can complete synchronization and/or time-frequency tracking in a relatively short time before the paging occasion, thereby reducing the power consumption of the terminal.

Further, before the step 301 of transmitting within the target time window the target synchronization signal/physical broadcast channel (SS/PBCH) block, the information transmission method further includes:

acquiring power-saving configuration information of the terminal; and in a case that the power-saving configuration information indicates that the terminal supports power-saving configuration, transmitting the target synchronization signal/physical broadcast channel (SS/PBCH) block.

The power-saving configuration information of the terminal is used for indicating whether the terminal supports the power-saving configuration.

Specifically, the acquiring the power-saving configuration information of the terminal includes:

acquiring by the network device the power-saving configuration information reported by the terminal, or, acquiring the power-saving configuration information configured by the network device for the terminal.

The power-saving configuration information may be statically or semi-statically configured by the network or dynamically indicated by the network through DCI.

Further, after the step 301 of transmitting within the target time window the target synchronization signal/physical broadcast channel (SS/PBCH) block, the information transmission method further includes:

sending a paging message on the paging occasion.

Further, in the step 301, transmitting within the target time window the target synchronization signal/physical broadcast channel (SS/PBCH) block includes:

starting to transmit the target synchronization signal/ physical broadcast channel (SS/PBCH) block at a first moment in the target time window, where the first moment is a moment corresponding to a first time unit in the target time window, and the first moment is a starting moment of the target time window or a moment after the starting moment.

Optionally, the first time unit may specifically be the first one of time units within the target time window, and the first time unit is a counter, a slot, a subframe, an Orthogonal Frequency Division Multiplexing (OFDM) symbol, a Cyclic Prefix-OFDM (CP-OFDM) symbol or a Discrete Fourier Transform-Spread-OFDM (DFT-s-OFDM) symbol. Optionally, the first one of time units is the first one of slots.

In addition, a second moment at which the transmission of the target synchronization signal/physical broadcast channel (SS/PBCH) block is completed is the ending moment of the target time window or a moment before the ending moment;

a second time unit where the ending moment of the target time window is located is the same as a third time unit where the paging occasion is located;

or, a second time unit where the ending moment of the target time window is located is before a third time unit where the paging occasion is located.

The second time unit is a counter, a slot, a sub-frame, an orthogonal frequency division multiplexing OFDM symbol, a cyclic prefix orthogonal frequency division multiplexing CP-OFDM symbol, or a discrete Fourier transform spread orthogonal frequency division multiplexing DFT-s-OFDM symbol.

The third time unit is a counter, a slot, a subframe, an orthogonal frequency division multiplexing OFDM symbol, a cyclic prefix orthogonal frequency division multiplexing CP-OFDM symbol or a discrete Fourier transform spread-spectrum orthogonal frequency division multiplexing DFT-s-OFDM symbol.

It should be noted that the time granularity of the second time unit and the time granularity of the third time unit are the same, e.g. if the second time unit is a slot, then the third time unit is also a slot; if the second time unit is an OFDM symbol, then the third time unit is also an OFDM symbol.

Further, the target synchronization signal/physical broadcast channel (SS/PBCH) block occupies N continuous or discontinuous time units within the target time window, and N is a positive real number.

Figure 4:
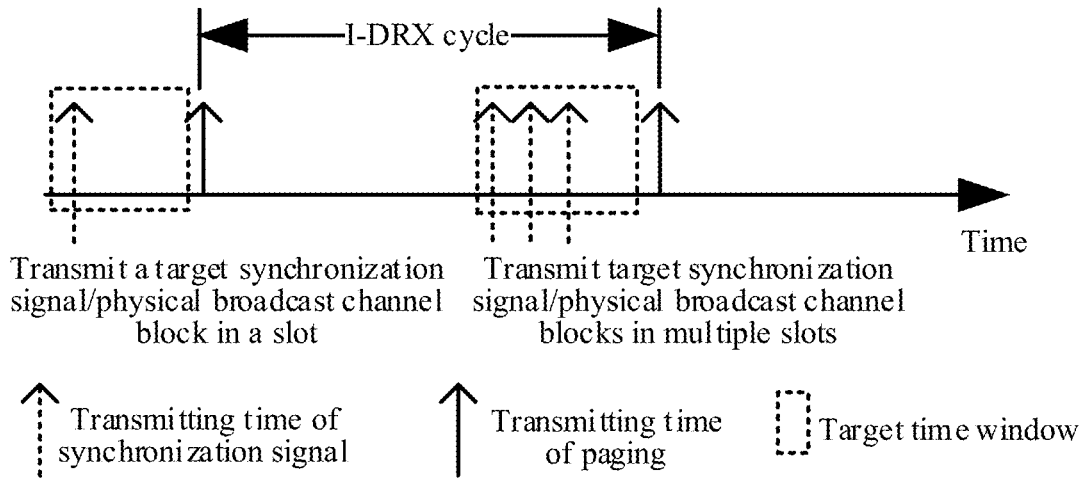
FIG. 4 is a schematic diagram of signal transmission provided by embodiments of the present disclosure.

The time unit may specifically be a slot. As shown in FIG. 4, in the target time window, the target SS/PBCH may be transmitted in one slot, or, in the target time window, the target SS/PBCH may be transmitted in multiple slots.

Specifically, in a case that the time unit is a slot, the target SS/PBCH may occupy N continuous slots within the target time window, and in a case that the time unit is an OFDM symbol, the target SS/PBCH may occupy N discontinuous OFDM symbols within the target time window.

Or, if there is no multiple beam configuration, the target SS/PBCH may occupy N continuous time units within the target time window, and if there is multiple beam configuration, the target SS/PBCH may occupy N continuous or discontinuous time units within the target time window.

Or, if the subcarrier spacing (SCS) is less than or equal to 30 KHz, the target SS/PBCH may occupy N continuous time units within the target time window; if the subcarrier spacing SCS is greater than 30 KHz, the target SS/PBCH may occupy N discontinuous time units within the target time window.

In addition, in a case that the target SS/PBCH may occupy N continuous slots in the target time window, the time-frequency location of the target synchronization signal/ physical broadcast channel block in each slot may be the same as the time-frequency location of the SS/PBCH of the NR R15, or may be configured by a base station; and the total transmission duration of the N continuous slots is less than or equal to the duration of the target time window.

N may be determined by the base station and the UE according to rules agreed in advance, may be configured by the base station, may be decided by the UE itself, or may be notified to the base station after being decided by the UE. Other methods for determining N are not specifically limited in the embodiments of the present disclosure. N may be statically, semi-statically or dynamically configured, or pre-defined by the base station and the UE, or configured by RRC signaling, or statically or semi-statically configured by MAC CE (Control Element), or dynamically configured by DCI.

Specifically, N is configured by the network device according to a synchronization state of the terminal, a cell position where the terminal is located, and/or an interference strength of a position of the terminal.

Or, N is pre-agreed by a protocol.

Or, N is determined by the terminal and then notified to the network device.

The time unit includes: a counter, a slot, a subframe, an orthogonal frequency division multiplexing (OFDM) symbol, a cyclic prefix orthogonal frequency division multiplexing (CP-OFDM) symbol or a discrete Fourier transform spread orthogonal frequency division multiplexing (DFT-s-OFDM) symbol.

As a first optional implementation mode, the implementation mode of configuring the value of N according to the synchronization state of the terminal may specifically include:

If the terminal is in an unsynchronized state, the value of N may be greater than 1, e.g. N=3, for completing synchronization and time-frequency tracking as soon as possible; the N time units may be continuous or discontinuous, and if the base station is configured with multiple beams, the value of N is configured according to the size of the target time window and the quantity of the beams.

If the terminal is in a synchronized state, the value of N may be configured to be 1.

As a second optional implementation, the implementation mode of configuring the value of N according to the interference strength of the position of the terminal may specifically include:

If the terminal is in an environment with strong interference, and the radio resource management (RRM) measurement quantity of the UE, e.g. the received signal strength indicator (RSSI), is higher than or equal to a first threshold (the first threshold is a real number) or the reference signal received quality (RSRQ) is lower than or equal to a second threshold (the second threshold is a real number), the value of N may be configured to be a real number larger than 1, e.g. N=3, which is used for improving synchronization precision and time-frequency tracking precision. The value of N may be configured to be 1 if RSSI measured by the UE is less than or equal to a second threshold, where the second threshold is less than or equal to the first threshold.

As a third optional implementation mode, the implementation mode of configuring the value of N according to the cell position where the terminal is located may specifically include:

If the UE is located at the cell edge, e.g. the signal to interference plus noise ratio (SINR) measured by the UE is lower than or equal to a third threshold which is a real number, or the RSRQ is lower than or equal to a fourth threshold which is a real number, or the RSRP is lower than or equal to a fifth threshold which is a real number, then the value of N may be configured to be a real number greater than 1, e.g. N=3; and if the SINR measured by the UE is higher than or equal to a fifth threshold, the value of N may be equal to 1, where the fifth threshold is greater than or equal to the third threshold.

It should be noted that if the base station needs to configure values of N for multiple UEs, the base station may configure one value of N for multiple UEs, or may configure different values of N for each UE. Specifically, it depends on the algorithm implementation of the base station.

According to the information transmission method provided by the embodiments of the present disclosure, in a case that the terminal supports the power-saving configuration, the network device can transmit the target synchronization signal/physical broadcast channel block of N time units in the target time window, so that the terminal receives the target synchronization signal/physical broadcast channel block in the target time window before receiving and detecting the PO. Since the time length corresponding to the target time window is smaller than the transmission cycle of the SS/PBCH, the terminal can complete synchronization and/or time-frequency tracking in a short time, so that the power consumption of the terminal is reduced.

Figure 5:
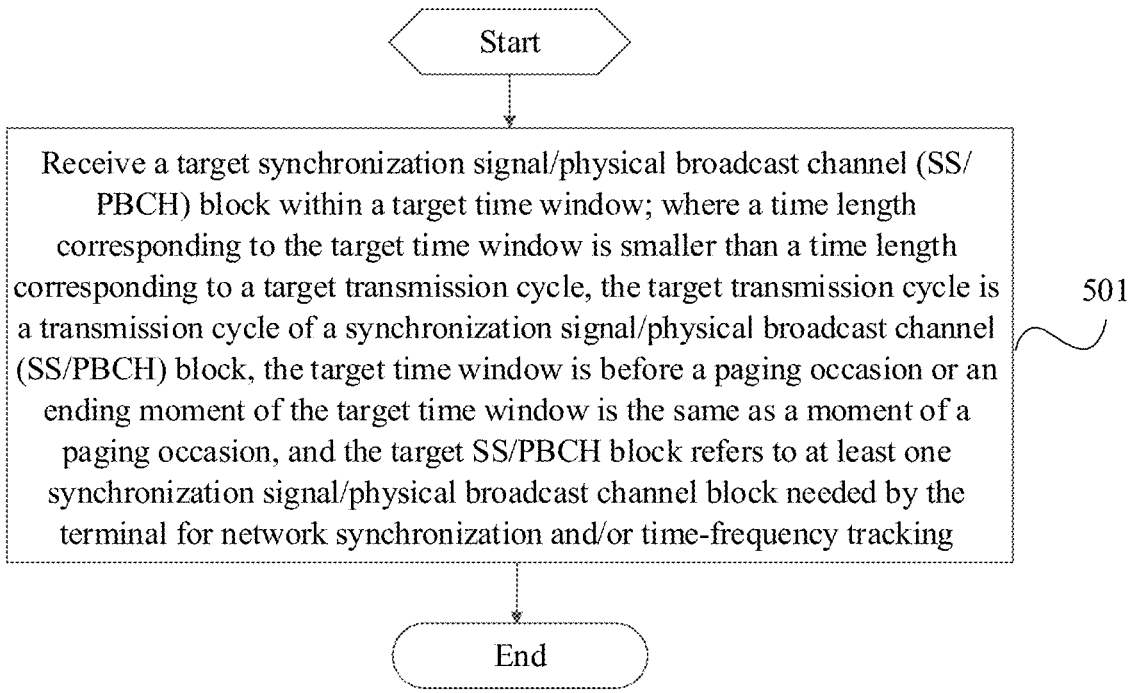
FIG. 5 is a second flow chart of an information transmission method provided by embodiments of the present disclosure.

As shown in FIG. 5, the embodiment of the present disclosure also provides an information transmission method applied to a terminal, and the method includes:

Step 501 includes: within a target time window, receiving a target synchronization signal/physical broadcast channel (SS/PBCH) block.

A time length corresponding to the target time window is smaller than a time length corresponding to a target transmission cycle, the target transmission cycle is a transmission cycle of a synchronization signal/physical broadcast channel (SS/PBCH) block, the target time window is before a paging occasion or an ending moment of the target time window is the same as a moment of a paging occasion, and the target synchronization signal/physical broadcast channel (SS/PBCH) block refers to at least one synchronization signal/physical broadcast channel block required by a terminal for network synchronization and/or time-frequency tracking. For example, the target synchronization signal/physical broadcast channel (SS/PBCH) block may be one synchronization signal/physical broadcast channel (SS/PBCH) block when the terminal is in the center of the cell, and the target synchronization signal/physical broadcast channel (SS/PBCH) block may include multiple synchronization signal/physical broadcast channel (SS/PBCH) blocks when the terminal is in an environment with strong interference or the terminal is at the edge of cell coverage or the terminal is in a non-synchronous state with the network.

The time length of the target time window may be predefined by the network. For example, when the current transmission cycle of the SS/PBCH configured by the network device is 160 ms, the time length corresponding to the target time window may be defined as 10 ms. The time length of the target time window may be configured by the network or semi-statically configured, e.g. by radio resource control RRC signaling. The time length of the target time window may be dynamically configured through downlink control information DCI.

Specifically, the time length corresponding to the target time window being smaller than the time length corresponding to the target transmission cycle includes:

the time length of the target time window is smaller than a time length corresponding to a minimum target transmission cycle configurable by the network device.

For example, the target transmission cycle in the NR-R 15 may be configured to be 5 ms, 10 ms, 20 ms, 40 ms, 80 ms or 160 ms, then the time length of the target time window may be configured to be less than 5 ms.

Or, the quantity of time units corresponding to the target time window is smaller than the total quantity of time units corresponding to the target transmission cycle.

The network device transmits the target SS/PBCH in the target time window, and the terminal receives the target SS/PBCH in the target time window. Since the time length corresponding to the target time window is less than the transmission cycle of the synchronization signal/physical broadcast channel (SS/PBCH) block, the terminal can complete synchronization and/or time-frequency tracking in a short time before the paging occasion, thereby reducing the power consumption of the terminal.

Further, before the above step 501 of receiving the target synchronization signal/physical broadcast channel (SS/PBCH) block, the information transmission method further includes:

acquiring power-saving configuration information of the terminal; and receiving the target synchronization signal/physical broadcast channel (SS/PBCH) block in a case that the power-saving configuration information indicates that the terminal supports power-saving configuration.

The power-saving configuration information of the terminal is used for indicating whether the terminal supports the power-saving configuration.

Specifically, the acquiring the power-saving configuration information of the terminal includes:

acquiring power-saving configuration information configured by the network device for the terminal.

The power-saving configuration information may be statically or semi-statically configured by the network or dynamically indicated by the network through DCI.

Further, after the above step 501 of receiving the synchronization signal/physical broadcast channel (SS/PBCH) block, the information transmission method further includes:

receiving a paging message on the paging occasion.

Further, the above step 501 of receiving the target synchronization signal/physical broadcast channel (SS/PBCH) block within the target time window includes:

starting to receive the target synchronization signal/physical broadcast channel (SS/PBCH) block at a first moment in the target time window, where the first moment is a moment corresponding to a first time unit in the target time window, and the first moment is a starting moment of the target time window or a moment after the starting moment.

Optionally, the first time unit may be the first one of time units within the target time window, the first time unit is a counter, a slot, a subframe, an orthogonal frequency division multiplexing (OFDM) symbol, a cyclic prefix orthogonal frequency division multiplexing (CP-OFDM) symbol, or a discrete Fourier transform spread orthogonal frequency division multiplexing (DFT-s-OFDM) symbol. Optionally, the first one of time units is the first one of slots.

In addition, a second moment at which the transmission of the target synchronization signal/physical broadcast channel (SS/PBCH) block is completed is the ending moment of the target time window or a moment before the ending moment;

a second time unit where the ending moment of the target time window is located is the same as a third time unit where the paging occasion is located;

or, a second time unit where the ending moment of the target time window is located is before a third time unit where the paging occasion is located.

The second time unit is a counter, a slot, a sub-frame, an orthogonal frequency division multiplexing OFDM symbol, a cyclic prefix orthogonal frequency division multiplexing CP-OFDM symbol, or a discrete Fourier transform spread orthogonal frequency division multiplexing DFT-s-OFDM symbol.

The third time unit is a counter, a slot, a subframe, an orthogonal frequency division multiplexing OFDM symbol, a cyclic prefix orthogonal frequency division multiplexing CP-OFDM symbol or a discrete Fourier transform spread-spectrum orthogonal frequency division multiplexing DFT-s-OFDM symbol.

It should be noted that the time granularity of the second time unit and the time granularity of the third time unit are the same, e.g. if the second time unit is a slot, then the third time unit is also a slot; if the second time unit is an OFDM symbol, then the third time unit is also an OFDM symbol.

Further, the target synchronization signal/physical broadcast channel (SS/PBCH) block occupies N continuous or discontinuous time units within the target time window, and N is a positive real number.

The time unit may be a slot. In the target time window, the target SS/PBCH may be received in one slot, or, in the target time window, the target SS/PBCH may be received in multiple slots.

Specifically, in a case that the time unit is a slot, the target SS/PBCH may occupy N continuous slots within the target time window, and in a case that the time unit is an OFDM symbol, the target SS/PBCH may occupy N discontinuous OFDM symbols within the target time window.

Or, if there is no multiple beam configuration, the target SS/PBCH may occupy N continuous time units within the target time window, and if there is multiple beam configuration, the target SS/PBCH may occupy N continuous or discontinuous time units within the target time window.

Or, if the subcarrier spacing (subcarrier spacing, SCS) is less than or equal to 30 KHz, the target SS/PBCH may occupy N continuous time units within the target time window; if the subcarrier spacing SCS is greater than 30 KHz, the target SS/PBCH may occupy N discontinuous time units within the target time window.

In addition, in a case that the target SS/PBCH may occupy N continuous slots in the target time window, the time-frequency location of the target synchronization signal/physical broadcast channel block in each slot may be the same as the time-frequency location of the SS/PBCH of the NR R15, or may be configured by a base station; and the total transmission duration of the N continuous slots is less than or equal to the duration of the target time window.

N may be determined by the base station and the UE according to rules agreed in advance, may be configured by the base station, may be decided by the UE itself, or may be notified to the base station after being decided by the UE. Other methods for determining N are not specifically limited in the embodiments of the present disclosure. N may be statically, semi-statically or dynamically configured, or predefined by the base station and the UE, or configured by RRC signaling, or statically or semi-statically configured by media access control (Media Access Control, MAC) control element (Control Element, CE), or dynamically configured by DCI.

Specifically, N is configured by the network device according to a synchronization state of the terminal, a cell position where the terminal is located and/or an interference strength of a position where the terminal is located.

Or, N is pre-agreed by a protocol;

Or, N is determined by the terminal and notified to the network device.

The time unit includes: a counter, a slot, a subframe, an orthogonal frequency division multiplexing (OFDM) symbol, a cyclic prefix orthogonal frequency division multiplexing (CP-OFDM) symbol or a discrete Fourier transform spread orthogonal frequency division multiplexing (DFT-s-OFDM) symbol.

According to the information transmission method provided by the embodiments of the present disclosure, in a case that the terminal supports the power-saving configuration, the network device can transmit the target synchronization signal/physical broadcast channel block of N time units in the target time window, so that the terminal receives the target synchronization signal/physical broadcast channel block in the target time window before receiving and detecting the PO. Since the time length corresponding to the target time window is smaller than the transmission cycle of the SS/PBCH, the terminal can complete synchronization and/or time-frequency tracking in a short time, so that the power consumption of the terminal is reduced.

Figure 6:
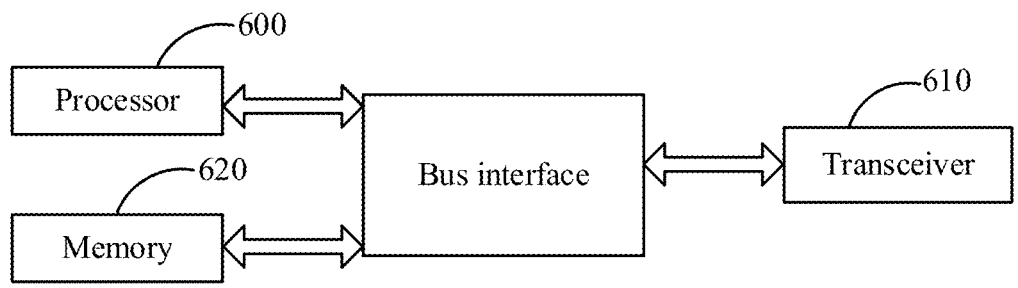
FIG. 6 is a block diagram of a network device provided by embodiments of the present disclosure.

As shown in FIG. 6, embodiments of the present disclosure also provide a network device, specifically, the network device is a base station, including a memory 620; a processor 600; a transceiver 610; a bus interface; and a computer program stored on the memory 620 and operable on the processor 600. The processor 600 is configured to read the program in the memory 620 to perform the following process:

transmitting, within a target time window, a target synchronization signal/physical broadcast channel (SS/PBCH) block.

The target synchronization signal/physical broadcast channel (SS/PBCH) block refers to at least one synchronization signal/physical broadcast channel block required by a terminal for network synchronization and/or time-frequency tracking, a time length corresponding to the target time window is smaller than a time length corresponding to a target transmission cycle, the target transmission cycle is a transmission cycle of a synchronization signal/physical broadcast channel (SS/PBCH) block, and the target time window is before a paging occasion or an ending moment of the target time window is the same as a moment of a paging occasion.

In FIG. 6, a bus architecture may include any quantity of interconnected buses and bridges, and various circuits of one or more processors represented by the processor 600 and a memory represented by the memory 620 are linked together. The bus architecture may also link various other circuits, such as peripheral devices, voltage regulators, power management circuits, which is well known in the art, and therefore will not be described further herein. The bus interface provides an interface. The transceiver 610 may be multiple elements, including a transmitter and a transceiver, for providing a unit used to communicate with various other devices over a transmission medium. The processor 600 is responsible for managing the bus architecture and common processing, and the memory 620 may store data used by processor 600 in performing operations.

Optionally, the processor 600 may also perform the following step when executing the computer program:

acquiring power-saving configuration information of the terminal; and in a case that the power-saving configuration information indicates that the terminal supports power-saving configuration, transmitting the target synchronization signal/physical broadcast channel (SS/PBCH) block.

Optionally, the processor 600 may also perform the following step when executing the computer program:

sending a paging message on the paging occasion.

Optionally, the processor 600 may also perform the following step when executing the computer program:

starting to transmit the target synchronization signal/physical broadcast channel (SS/PBCH) block at a first moment in the target time window, where the first moment is a moment corresponding to a first time unit in the target time window, and the first moment is a starting moment of the target time window or a moment after the starting moment.

Optionally, a second moment at which the transmission of the target synchronization signal/physical broadcast channel (SS/PBCH) block is completed is the ending moment of the target time window or a moment before the ending moment;

a second time unit where the ending moment of the target time window is located is the same as a third time unit where the paging occasion is located;

or, a second time unit where the ending moment of the target time window is located is before a third time unit where the paging occasion is located.

Optionally, the time length corresponding to the target time window being smaller than the time length corresponding to the target transmission cycle includes:

the time length of the target time window is smaller than a time length corresponding to a minimum target transmission cycle configurable by the network device; or, the quantity of time units corresponding to the target time window is smaller than the total quantity of time units corresponding to the target transmission cycle.

Optionally, the target synchronization signal/physical broadcast channel (SS/PBCH) block occupies N continuous or discontinuous time units within the target time window and N is a positive real number.

N is configured by the network device according to a synchronization state of the terminal, a cell position where the terminal is located and/or an interference strength of a position where the terminal is located.

Or, N is pre-agreed by a protocol.

Or, N is determined by the terminal and then notified to the network device.

Optionally, the time unit includes: a counter, a slot, a subframe, an orthogonal frequency division multiplexing (OFDM) symbol, a cyclic prefix orthogonal frequency division multiplexing (CP-OFDM) symbol or a discrete Fourier transform spread orthogonal frequency division multiplexing (DFT-s-OFDM) symbol.

Some embodiments of the present disclosure also provide a computer-readable storage medium having a computer program stored thereon, where the computer program, when executed by a processor, performs the following step:

transmitting, within a target time window, a target synchronization signal/physical broadcast channel (SS/PBCH) block.

The target synchronization signal/physical broadcast channel (SS/PBCH) block refers to at least one synchronization signal/physical broadcast channel block required by a terminal for network synchronization and/or time-frequency tracking, a time length corresponding to the target time window is smaller than a time length corresponding to a target transmission cycle, the target transmission cycle is the transmission cycle of a synchronization signal/physical broadcast channel (SS/PBCH) block, and the target time window is before a paging occasion or an ending moment of the target time window is the same as a moment of a paging occasion.

The program, when executed by the processor, can implement all the implementation modes described above in the embodiments of the method applied to the network device side, and will not be described in detail here in order to avoid repetition.

Figure 7:
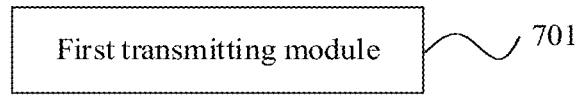
FIG. 7 is a schematic diagram of modules of a network device provided by embodiments of the present disclosure.

As shown in FIG. 7, embodiments of the present disclosure also provide a network device, including:

a first transmitting module 701, configured to transmit, within a target time window, a target synchronization signal/physical broadcast channel (SS/PBCH) block.

The target synchronization signal/physical broadcast channel (SS/PBCH) block refers to at least one synchronization signal/physical broadcast channel block required by the terminal for network synchronization and/or time-frequency tracking, a time length corresponding to the target time window is smaller than a time length corresponding to a target transmission cycle, the target transmission cycle is a transmission cycle of a synchronization signal/physical broadcast channel (SS/PBCH) block, and the target time window is before a paging occasion or an ending moment of the target time window is the same as a moment of a paging occasion.

The network device according to embodiments of the present disclosure further includes:

an acquisition module, configured to acquire power-saving configuration information of the terminal before the first transmitting module transmits the target synchronization signal/physical broadcast channel (SS/PBCH) block; and a second transmitting module, configured to transmit the target synchronization signal/physical broadcast channel (SS/PBCH) block in a case that the power-saving configuration information indicates that the terminal supports the power-saving configuration.

The network device according to embodiments of the present disclosure further includes:

a third transmitting module, configured to transmit a paging message on the paging occasion after the first transmitting module transmits the target synchronization signal/physical broadcast channel (SS/PBCH) block.

In the network device according to embodiments of the present disclosure, the first transmitting module is configured to start to transmit the target synchronization signal/physical broadcast channel (SS/PBCH) block at a first moment in the target time window, where the first moment is a moment corresponding to a first time unit in the target time window, and the first moment is a starting moment of the target time window or a moment after the starting moment.

According to the network device of the embodiments of the present disclosure, a second moment at which the transmission of the target synchronization signal/physical broadcast channel (SS/PBCH) block is completed is the ending moment of the target time window or a moment before the ending moment;

a second time unit where the ending moment of the target time window is located is the same as a third time unit where the paging occasion is located;

or, a second time unit where the ending moment of the target time window is located is before a third time unit where the paging occasion is located.

According to the network device, the time length corresponding to the target time window being smaller than the time length corresponding to the target transmission cycle includes:

the time length of the target time window is smaller than a time length corresponding to a minimum target transmission cycle configurable by the network device; or, the quantity of time units corresponding to the target time window is smaller than the total quantity of time units corresponding to the target transmission cycle.

According to the network device, the target synchronization signal/physical broadcast channel (SS/PBCH) block occupies N continuous or discontinuous time units in the target time window, and N is a positive real number;

N is configured by the network device according to a synchronization state of the terminal, a cell position where the terminal is located and/or an interference strength of a position where the terminal is located.

Or, N is pre-agreed by a protocol.

Or, N is determined by the terminal and notified to the network device.

According to the network device of embodiments of the present disclosure, the time unit includes: a counter, a slot, a subframe, an orthogonal frequency division multiplexing (OFDM) symbol, a cyclic prefix orthogonal frequency division multiplexing (CP-OFDM) symbol or a discrete Fourier transform spread orthogonal frequency division multiplexing (DFT-s-OFDM) symbol.

According to the network device of the embodiments of the present disclosure, the target SS/PBCH block is sent in the target time window, and the terminal receives the target SS/PBCH block in the target time window. Since the time length corresponding to the target time window is smaller than the transmission cycle of the synchronization signal/physical broadcast channel (SS/PBCH) block, the terminal can complete synchronization and/or time-frequency tracking in a short time before the paging occasion, and the power consumption of the terminal is reduced.

Figure 8:
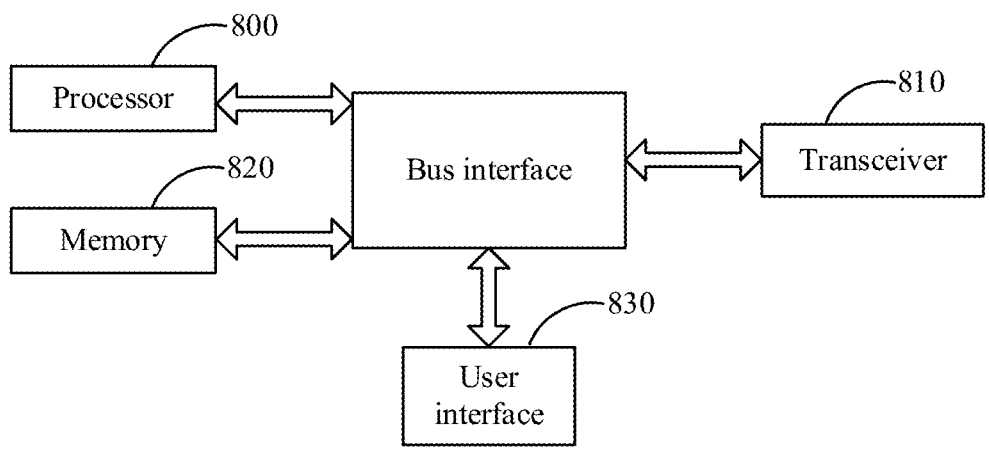
FIG. 8 is a block diagram of a terminal provided by embodiments of the present disclosure.

As shown in FIG. 8, embodiments of the present disclosure also provide a terminal, including: a transceiver 810, a memory 820, a processor 800 and a computer program stored on the memory and executable on the processor, and the processor implements the following step when executing the computer program:

receiving, within a target time window, a target synchronization signal/physical broadcast channel (SS/PBCH) block.

The target synchronization signal/physical broadcast channel (SS/PBCH) block refers to at least one synchronization signal/physical broadcast channel block required by the terminal for network synchronization and/or time-frequency tracking, a time length corresponding to the target time window is smaller than a time length corresponding to a target transmission cycle, the target transmission cycle is the transmission cycle of a synchronization signal/physical broadcast channel (SS/PBCH) block, and the target time window is before a paging occasion or an ending moment of the target time window is the same as a moment of a paging occasion.

In FIG. 8, a bus architecture may include any quantity of interconnected buses and bridges, and various circuits of one or more processors represented by the processor 800 and a memory represented by the memory 820 are linked together. The bus architecture may also link various other circuits, such as peripheral devices, voltage regulators, power management circuits, which is well known in the art, and therefore will not be described further herein. The bus interface provides the interface. The transceiver 810 may be multiple elements, including a transmitter and a transceiver, for providing a unit used to communicate with various other devices over a transmission medium. The user interface 830 may also be an interface that can connect required devices externally or internally for different user equipments, including but not limited to a keypad, a display, a speaker, a microphone, a joystick, etc.

The processor 800 is responsible for managing the bus architecture and common processing, and the memory 820 may store data used by the processor 800 in performing operations.

Optionally, the processor 800 is also configured to read the program in the memory 820 to perform the following steps:

acquiring power-saving configuration information of the terminal; and receiving the target synchronization signal/physical broadcast channel (SS/PBCH) block in a case that the power-saving configuration information indicates that the terminal supports power-saving configuration.

Optionally, the processor 800 is also configured to read the program in the memory 820 to perform the following step:

receiving a paging message on the paging occasion.

Optionally, the processor 800 is also configured to read the program in the memory 820 to perform the following step:

starting to receive the target synchronization signal/physical broadcast channel (SS/PBCH) block at a first moment in the target time window, where the first moment is a moment corresponding to a first time unit in the target time window, and the first moment is a starting moment of the target time window or a moment after the starting moment.

Optionally, a second moment when the transmission of the target synchronization signal/physical broadcast channel (SS/PBCH) block is completed is an ending moment of the target time window or a moment before the ending moment;

a second time unit where the ending moment of the target time window is located is the same as a third time unit where the paging occasion is located;

or, a second time unit where the ending moment of the target time window is located is before a third time unit where the paging occasion is located.

Optionally, the time length corresponding to the target time window being less than the time length corresponding to the target transmission cycle includes:

the time length of the target time window is smaller than a time length corresponding to a minimum target transmission cycle configurable by a network device; or, the quantity of time units corresponding to the target time window is smaller than the total quantity of time units corresponding to the target transmission cycle.

Optionally, the target synchronization signal/physical broadcast channel (SS/PBCH) block occupies N continuous or discontinuous time units within the target time window, N is a positive real number;

N is configured by the network device according to a synchronization state of the terminal, the cell position where the terminal is located and/or an interference strength of a position where the terminal is located.

Or, N is pre-agreed by a protocol.

Or, N is determined by the terminal and notified to the network device.

Optionally, the time unit includes: a counter, a slot, a subframe, an orthogonal frequency division multiplexing (OFDM) symbol, a cyclic prefix orthogonal frequency division multiplexing (CP-OFDM) symbol or a discrete Fourier transform spread orthogonal frequency division multiplexing (DFT-s-OFDM) symbol.

Some embodiments of the present disclosure also provide a computer-readable storage medium having a computer program stored thereon, where the computer program, when executed by a processor, performs the following step:

receiving, within a target time window, a target synchronization signal/physical broadcast channel (SS/PBCH) block.

The target synchronization signal/physical broadcast channel (SS/PBCH) block refers to at least one synchronization signal/physical broadcast channel block required by the terminal for network synchronization and/or time-frequency tracking, a time length corresponding to the target time window is smaller than a time length corresponding to a target transmission cycle, the target transmission cycle is a transmission cycle of a synchronization signal/physical broadcast channel (SS/PBCH) block, and the target time window is before a paging occasion or an ending moment of the target time window is the same as a moment of a paging occasion.

The program, when executed by the processor, can implement all the implementation modes described above in the embodiments of the method applied to the terminal side, and will not be described in detail here in order to avoid repetition.

Figure 9:
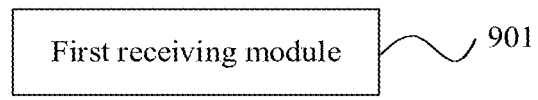
FIG. 9 is a schematic diagram of modules of a terminal provided by embodiments of the present disclosure.

As shown in FIG. 9, embodiments of the present disclosure also provide a terminal, including:

a first receiving module 901, configured to receive a target synchronization signal/physical broadcast channel (SS/PBCH) block within a target time window;

The target synchronization signal/physical broadcast channel (SS/PBCH) block refers to at least one synchronization signal/physical broadcast channel block required by a terminal for network synchronization and/or time-frequency tracking, a time length corresponding to the target time window is smaller than a time length corresponding to a target transmission cycle, the target transmission cycle is the transmission cycle of a synchronization signal/physical broadcast channel (SS/PBCH) block, and the target time window is before a paging occasion or an ending moment of the target time window is the same as a moment of a paging occasion.

The terminal of the embodiments of the present disclosure further includes:

a second acquisition module, configured to acquire power-saving configuration information of the terminal before the first receiving module receives the target synchronization signal/physical broadcast channel (SS/PBCH) block; and a the second receiving module, configured to receive the target synchronization signal/physical broadcast channel (SS/PBCH) block in a case that the power-saving configuration information indicates that the terminal supports the power-saving configuration.

The terminal of the embodiments of the present disclosure further includes:

a third receiving module, configured to receive a paging message on the paging occasion after the first receiving module receives the target synchronization signal/physical broadcast channel (SS/PBCH) block.

In the terminal of the embodiments of the present disclosure, the first receiving module is configured to start to receive the target synchronization signal/physical broadcast channel (SS/PBCH) block at a first moment in the target time window, where the first moment is a moment corresponding to a first time unit in the target time window, and the first moment is a starting moment of the target time window or a moment after the starting moment.

According to the terminal of the embodiments of the present disclosure, a second moment when the transmission of the target synchronization signal/physical broadcast channel (SS/PBCH) block is completed is an ending moment of the target time window or a moment before the ending moment;

a second time unit where the ending moment of the target time window is located is the same as a third time unit where the paging occasion is located; or, a second time unit where the ending moment of the target time window is located is before a third time unit where the paging occasion is located.

According to the terminal of the embodiments of the present disclosure, the time length corresponding to the target time window being smaller than the time length corresponding to the target transmission cycle includes:

the time length of the target time window is smaller than a time length corresponding to a minimum target transmission cycle configurable by a network device; or, the quantity of time units corresponding to the target time window is smaller than the total quantity of time units corresponding to the target transmission cycle.

According to the terminal, the target synchronization signal/physical broadcast channel (SS/PBCH) block occupies N continuous or discontinuous time units in the target time window, and N is a positive real number.

N is configured by a network device according to a synchronization state of the terminal, a cell position where the terminal is located and/or an interference strength of a position where the terminal is located.

Or, N is pre-agreed by a protocol.

Or, N is determined by the terminal and notified to the network device.

According to the terminal of embodiments of the present disclosure, the time unit includes: a counter, a slot, a subframe, an orthogonal frequency division multiplexing (OFDM) symbol, a cyclic prefix orthogonal frequency division multiplexing (CP-OFDM) symbol or a discrete Fourier transform spread orthogonal frequency division multiplexing (DFT-s-OFDM) symbol.

According to the embodiments of the present disclosure, the network device sends the target synchronization signal/ physical broadcast channel (SS/PBCH) block in the target time window, and the terminal receives the target synchronization signal/physical broadcast channel (SS/PBCH) block in the target time window. Since the time length corresponding to the target time window is smaller than the transmission cycle of the synchronization signal/physical broadcast channel (SS/PBCH) block, the terminal can complete synchronization and/or time-frequency tracking in a short time before the paging occasion, thereby reducing the power consumption of the terminal.

Embodiments of the present disclosure also provide a computer-readable storage medium having a computer program stored thereon, where the computer program, when executed by a processor, implements the various processes of the above-described method embodiments and achieves the same technical effects, which will not be described in detail in order to avoid repetition. The computer-readable storage medium may be a read-only memory (Read-Only Memory, ROM), a random access memory (Random Access Memory, RAM), a magnetic disk or an optical disk, or the like.

It should be noted that the terms such as "having" and "including" or any other variants thereof, are intended to cover a non-exclusive inclusion, such that a process, method, article, or apparatus that includes a list of elements not only include those elements but may also include other elements that are not expressly listed or that are inherent to such process, method, article, or apparatus. Without more constraints, an element defined by the phrase "including a . . . " does not preclude the existence of additional same elements in the process, method, article, or apparatus that includes the element.

From the above description of the embodiments, it will be clear to a person skilled in the art that the method of the above embodiments may be implemented by means of software plus common hardware platform as needed, or by means of hardware. With such an understanding, the essence the technical solutions of the present disclosure or the part contributing to the related technologies may be embodied in the form of a software product, and the computer software product is stored in a storage medium (e.g. ROM/RAM, magnetic disk, optical disk) including instructions to enable a terminal (which may be a cell phone, a computer, a server, an air conditioner or a network device) to perform the methods described in the various embodiments of the present disclosure.

For example, the above modules may be one or more integrated circuits configured to implement the above methods, such as one or more application specific integrated circuits (Application Specific Integrated Circuit, ASIC), or one or more microprocessors, or one or more digital signal processors (Digital Signal Processor, DSP), or one or more field programmable gate arrays (Field Programmable Gate Array, FPGA), etc. As another example, when a module described above is implemented in the form of scheduling program codes by a processing element, the processing element may be a general purpose processor, such as a central processing unit (Central Processing Unit, CPU) or other processors that may call program codes. As another example, these modules may be integrated together and implemented as a system-on-a-chip (System-on-a-chip, SOC).

In the various embodiments of the present disclosure, it should be understood that sizes of the sequence numbers of the processes described above are not meant to imply an order of execution, and the order of execution of the processes should be determined by their functions and inherent logic, which should not be construed as limiting the implementations of the embodiments of the present disclosure in any way.

Optional implementations of the present disclosure are described in the above. It should be noted that, for those skilled in the art, various improvements and modifications may be made without departing from the principle of the present disclosure, and these improvements and modifications fall within the protection scope of the present disclosure.

What is claimed is:

1. An information transmission method, applied to a network device, comprising:
   transmitting, within a target time window, a target synchronization signal/physical broadcast channel (SS/PBCH) block;
   wherein the target synchronization signal/physical broadcast channel (SS/PBCH) block refers to at least one synchronization signal/physical broadcast channel block required by a terminal for network synchronization and/or time-frequency tracking, a time length corresponding to the target time window is smaller than a time length corresponding to a target transmission cycle, the target transmission cycle is a transmission cycle for periodically transmitting the target synchronization signal/physical broadcast channel (SS/PBCH) block, and the target time window is before a paging occasion or an ending moment of the target time window is the same as a moment of a paging occasion;

wherein the target synchronization signal/physical broadcast channel (SS/PBCH) block is used by the terminal to perform network synchronization and/or time-frequency tracking before the paging occasion, such that the terminal performs paging detection in the paging occasion after completing the network synchronization and/or time-frequency tracking;

wherein the transmitting, within the target time window, the target synchronization signal/physical broadcast channel (SS/PBCH) block comprises: starting to transmit the target synchronization signal/physical broadcast channel (SS/PBCH) block at a first moment in the target time window, wherein the first moment is a moment corresponding to a first time unit in the target time window, and the first moment is a starting moment of the target time window;

wherein a second moment at which the transmission of the target synchronization signal/physical broadcast channel (SS/PBCH) block is completed is the ending moment of the target time window.

2. The information transmission method according to claim 1, wherein before the transmitting the target synchronization signal/physical broadcast channel (SS/PBCH) block, the method further comprises:

acquiring power-saving configuration information of the terminal, the power-saving configuration information indicating that the terminal supports power-saving configuration.

3. The information transmission method according to claim 1, wherein after the transmitting the target synchronization signal/physical broadcast channel (SS/PBCH) block, the method further comprises:

sending a paging message on the paging occasion.

4. The information transmission method according to claim 1, wherein a second time unit where the ending moment of the target time window is located is the same as a third time unit where the paging occasion is located; or, a second time unit where the ending moment of the target time window is located is before a third time unit where the paging occasion is located.

5. The information transmission method according to claim 1, wherein the time length corresponding to the target time window being smaller than the time length corresponding to the target transmission cycle comprises:

the time length of the target time window is smaller than a time length corresponding to a minimum target transmission cycle configurable by the network device; or, the quantity of time units corresponding to the target time window is smaller than the total quantity of time units corresponding to the target transmission cycle.

6. The information transmission method according to claim 1, wherein the target synchronization signal/physical broadcast channel (SS/PBCH) block occupies N continuous or discontinuous time units within the target time window and N is a positive real number;

wherein N is configured by the network device according to a synchronization state of the terminal, a cell position where the terminal is located and/or an interference strength of a position where the terminal is located; or, N is pre-agreed by a protocol; or, N is determined by the terminal and notified to the network device.

7. An information transmission method, applied to a terminal, comprising:

receiving, within a target time window, a target synchronization signal/physical broadcast channel (SS/PBCH) block;

wherein the target synchronization signal/physical broadcast channel (SS/PBCH) block refers to at least one synchronization signal/physical broadcast channel block required by the terminal for network synchronization and/or time-frequency tracking, a time length corresponding to the target time window is smaller than a time length corresponding to a target transmission cycle, the target transmission cycle is a transmission cycle for periodically transmitting the target synchronization signal/physical broadcast channel (SS/PBCH) block, and the target time window is before a paging occasion or an ending moment of the target time window is the same as a moment of a paging occasion;

wherein the target synchronization signal/physical broadcast channel (SS/PBCH) block is used by the terminal to perform network synchronization and/or time-frequency tracking before the paging occasion, such that the terminal performs paging detection in the paging occasion after completing the network synchronization and/or time-frequency tracking;

wherein the receiving, within the target time window, the target synchronization signal/physical broadcast channel (SS/PBCH) block comprises: starting to receive the target synchronization signal/physical broadcast channel (SS/PBCH) block at a first moment in the target time window, wherein the first moment is a moment corresponding to a first time unit in the target time window, and the first moment is a starting moment of the target time window;

wherein a second moment at which the transmission of the target synchronization signal/physical broadcast channel (SS/PBCH) block is completed is the ending moment of the target time window.

8. The information transmission method according to claim 7, wherein:

before the receiving the target synchronization signal/physical broadcast channel (SS/PBCH) block, the method further comprises:

acquiring power-saving configuration information of the terminal, the power-saving configuration information indicating that the terminal supports power-saving configuration; or, after the receiving the target synchronization signal/physical broadcast channel (SS/PBCH) block, the method further comprises:

receiving a paging message on the paging occasion.

9. The information transmission method according to claim 7, wherein a second time unit where the ending moment of the target time window is located is the same as a third time unit where the paging occasion is located; or, a second time unit where the ending moment of the target time window is located is before a third time unit where the paging occasion is located.

10. The information transmission method according to claim 7, wherein the time length corresponding to the target time window being smaller than the time length corresponding to the target transmission cycle comprises:

the time length of the target time window is smaller than a time length corresponding to a minimum target transmission cycle configurable by a network device; or, the quantity of time units corresponding to the target time window is smaller than the total quantity of time units corresponding to the target transmission cycle.

11. The information transmission method according to claim 7, wherein the target synchronization signal/physical broadcast channel (SS/PBCH) block occupies N continuous or discontinuous time units within the target time window and N is a positive real number;

wherein N is configured by a network device according to a synchronization state of the terminal, a cell position where the terminal is located and/or an interference strength of a position where the terminal is located; or, N is pre-agreed by a protocol; or N is determined by the terminal and notified to a network device.

12. A terminal, comprising: a transceiver, a memory, a processor, and a program stored on the memory and executable on the processor, wherein the processor performs the steps of the information transmission method according to claim 7 when executing the program.

13. The terminal according to claim 12, wherein:

the processor further performs the following steps when executing the program:

acquiring power-saving configuration information of the terminal, the power-saving configuration information indicating that the terminal supports power-saving configuration; or, the processor further performs the following step when executing the program:

receiving a paging message on the paging occasion.

14. The terminal according to claim 12, wherein a second time unit where the ending moment of the target time window is located is the same as a third time unit where the paging occasion is located; or, a second time unit where the ending moment of the target time window is located is before a third time unit where the paging occasion is located.

15. The terminal according to claim 12, wherein the time length corresponding to the target time window being smaller than the time length corresponding to the target transmission cycle comprises:

the time length of the target time window is smaller than a time length corresponding to a minimum target transmission cycle configurable by a network device; or, the quantity of time units corresponding to the target time window is smaller than the total quantity of time units corresponding to the target transmission cycle.

16. A network device, comprising: a transceiver, a memory, a processor, and a program stored on the memory and executable on the processor, wherein the processor performs the following step when executing the program:

transmitting, within a target time window, a target synchronization signal/physical broadcast channel (SS/PBCH) block;

wherein the target synchronization signal/physical broadcast channel (SS/PBCH) block refers to at least one synchronization signal/physical broadcast channel block required by a terminal for network synchronization and/or time-frequency tracking, a time length corresponding to the target time window is smaller than a time length corresponding to a target transmission cycle, the target transmission cycle is the transmission cycle for periodically transmitting the target synchronization signal/physical broadcast channel (SS/PBCH) block, and the target time window is before a paging occasion or an ending moment of the target time window is the same as a moment of a paging occasion;

wherein the target synchronization signal/physical broadcast channel (SS/PBCH) block is used by the terminal to perform network synchronization and/or time-frequency tracking before the paging occasion, such that the terminal performs paging detection in the paging occasion after completing the network synchronization and/or time-frequency tracking;

wherein the processor further performs the following step when executing the program:

starting to transmit the target synchronization signal/physical broadcast channel (SS/PBCH) block at a first moment in the target time window, wherein the first moment is a moment corresponding to a first time unit in the target time window, and the first moment is a starting moment of the target time window;

wherein a second moment when the transmission of the target synchronization signal/physical broadcast channel (SS/PBCH) block is completed is an ending moment of the target time window.

17. The network device according to claim 16, wherein:

the processor further performs the following step when executing the program:

acquiring power-saving configuration information of the terminal, the power-saving configuration information indicating that the terminal supports power-saving configuration; or, the processor further performs the following step when executing the program:

sending a paging message on the paging occasion.

18. The network device according to claim 16, wherein a second time unit where the ending moment of the target time window is located is the same as a third time unit where the paging occasion is located; or, a second time unit where the ending moment of the target time window is located is before a third time unit where the paging occasion is located.

19. The network device according to claim 16, wherein the time length corresponding to the target time window being smaller than the time length corresponding to the target transmission cycle comprises:

the time length of the target time window is smaller than a time length corresponding to a minimum target transmission cycle configurable by the network device; or, the quantity of time units corresponding to the target time window is smaller than the total quantity of time units corresponding to the target transmission cycle.

20. The network device according to claim 16, wherein the target synchronization signal/physical broadcast channel (SS/PBCH) block occupies N continuous or discontinuous time units within the target time window and N is a positive real number;

wherein N is configured by the network device according to a synchronization state of the terminal, a cell position where the terminal is located and/or an interference strength of a position where the terminal is located; or, N is pre-agreed by a protocol; or, N is determined by the terminal and notified to the network device.

* * * * *